No. 688,828. Patented Dec. 17, 1901.
A. S. CLIFT.
SPEED REGULATING DEVICE FOR OVERHEAD ELECTRIC CARRIERS.
(Application filed Apr. 19, 1901.)
(No Model.)
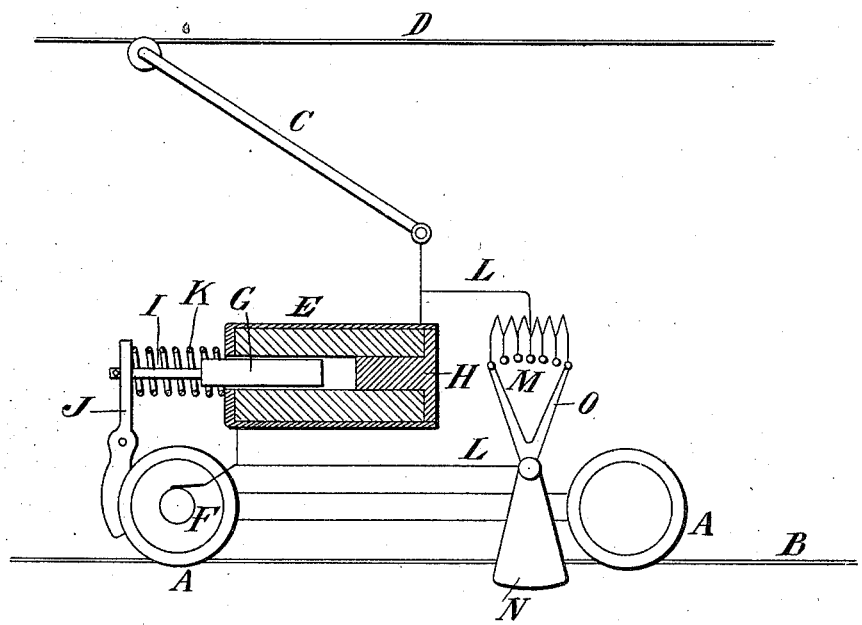
Witnesses
Bert C. Jones
Chas. W. Hildreth
Arthur S. Clift
Inventor
By his Attorneys

UNITED STATES PATENT OFFICE.

ARTHUR S. CLIFT, OF EAST ORANGE, NEW JERSEY.

SPEED-REGULATING DEVICE FOR OVERHEAD ELECTRIC CARRIERS.

SPECIFICATION forming part of Letters Patent No. 688,828, dated December 17, 1901.

Application filed April 19, 1901. Serial No. 66,544. (No model.)

*To all whom it may concern:*

Be it known that I, ARTHUR S. CLIFT, a citizen of the United States, and a resident of East Orange, Essex county, State of New Jersey, have invented certain new and useful Improvements in Speed-Regulating Devices for Overhead Electric Carriers, of which the following is a specification.

The object of my invention is to provide a device which when the car is running on a downgrade will apply the brake with a pressure corresponding to the steepness of the grade.

The accompanying drawing is a diagrammatic representation of my improvement.

A A are the trucks of the carrier, running on a suitable cable or wire B.

C is the trolley, having the usual contact-wheel receiving current from the wire D.

E is a solenoid which is connected in series with the motor F. Within the solenoid is a metallic plunger G, which fits nearly air-tight. The other end of the orifice in the solenoid is filled with a plug H. Attached to the plunger G is a rod I, connected to the brake-lever J.

K is a spring bearing against the end of the solenoid and the end of the brake-lever, normally tending to keep the brake applied to the wheel.

From the construction so far described it will be seen that the current passing through the solenoid and through the motor will draw the bar G inward, and thus keep the brake off the wheel against the force of the spring K. When the current is broken or interrupted, the full force of the spring is applied to put on the brake.

Running around the solenoid is a shunt-circuit L, which may have as a part of it a rheostat M.

Attached to the carriage is a pendulum N, the upper end O being arranged to come into contact with the contact-pieces of the rheostat. The result of this construction is that when the car is tilted going down a grade the pendulum swings to the right (looking at the drawing) and the contact-piece of the pendulum is brought against the contact-pieces of the rheostat, thus cutting out a certain amount of the resistance and allowing a certain portion of the current to pass around the solenoid. The action of the spring therefore on the brake is increased, and as the power of the solenoid is sufficient to keep the brake off the wheel under normal conditions the shunting of a portion of the current will put the brake on. It will be obvious that the steeper the grade the greater will be the swing of the pendulum, the greater the quantity of the current that will pass around the solenoid, and consequently the greater will be the force with which the brake is applied. In the extreme limit of swing of the pendulum the solenoid is cut out entirely, the full force of the current being shunted around it, and consequently the full force of the brake applied to the car. The bar G, fitting tightly within the orifice in the solenoid, acts as a dash-pot to prevent sudden movements of the bar, thus making the loosening and tightening of the brake gradual. I thus produce a device which will apply the brake with a force proportional to the steepness of the grade down which the car is then running.

What I claim, and desire to secure by Letters Patent, is—

1. The combination with a carrier for overhead electric railways of a brake and means for applying said brake with a force proportional to the steepness of the grade down which the car is running, substantially as described.

2. The combination with a car for overhead electric railways of a brake, a solenoid normally acting to keep the brake off, said solenoid being in series with the motor, a shunt-circuit around said solenoid and means on the car for shunting the current when the car is tilted, substantially as described.

3. In a car for overhead electric railways the combination of a brake, a spring tending normally to keep the brake on, a solenoid in series with the motor of a strength to keep the brake off against the force of the spring and means for varying the power of the solenoid in accordance with the steepness of the grade, substantially as described.

Signed in the city and county of New York and State of New York this 5th day of March, 1901.

ARTHUR S. CLIFT.

Witnesses:
H. M. HARDING,
JOHN J. RANAGAN.